June 2, 1925.  
O. G. TEMME  
1,539,884  
ADJUSTABLE BUMPER FOR AUTOMOBILES  
Filed July 18, 1924
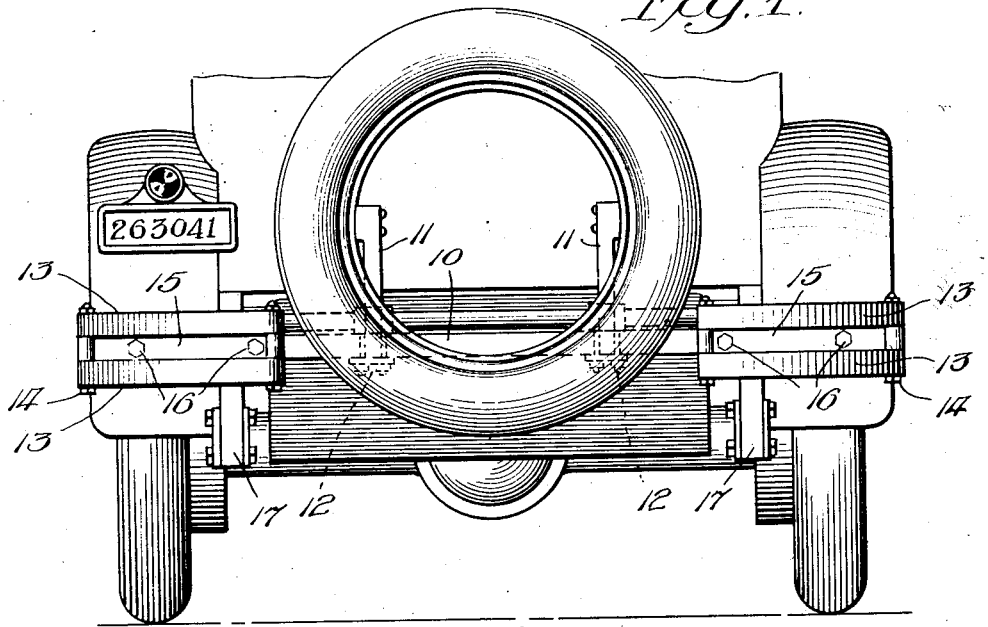
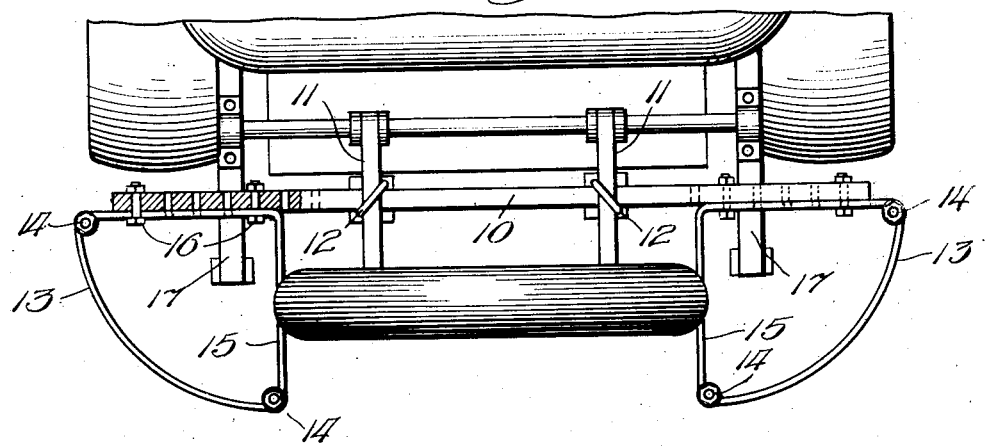
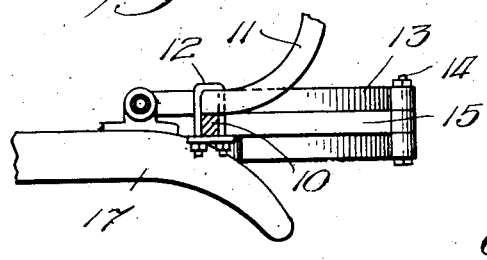
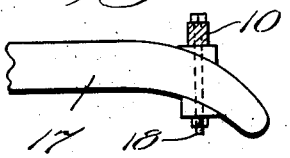
Inventor:  
Oliver G. Temme  
by Clarence J. Loftus  
Atty Patented June 2, 1925.

1,539,884

UNITED STATES PATENT OFFICE.

OLIVER G. TEMME, OF CHICAGO, ILLINOIS.

ADJUSTABLE BUMPER FOR AUTOMOBILES.

Application filed July 18, 1924. Serial No. 726,719.

*To all whom it may concern:*

Be it known that I, OLIVER G. TEMME, a citizen of the United States, residing at Chicago, in the county of Cook and State of Illinois, have invented a certain new and useful Adjustable Bumper for Automobiles, of which the following is a specification.

This invention pertains to bumpers for automobiles, and particularly the rear bumper.

Various attempts have heretofore been made to provide a practical bumper for automobiles, particularly the rear bumper, but with the constructions heretofore known, aside from my own work, it has been necessary to build the bumper in most cases to fit the automobile, due primarily to the different construction and varying sizes of the different automobiles, particularly the variation in width of the car and fenders.

Therefore, it is an object of my invention to provide an adjustable bumper particularly adapted for the rear of an automobile, which does not in anywise interfere with the placement or removal of the spare tires, and which can be made up as a complete unit at the factory, shipped in knock-down form and readily and quickly assembled, adjusted and attached to various types of automobiles by unskilled hands.

The above and other features of novelty, advantages and capabilities will become apparent from a detailed description of the accompanying drawings, in which I have illustrated constructions embodying different forms of my invention, but the constructions there shown are to be understood as illustrative only and not as defining the limits of my invention.

Figure 1 is a rear elevational view of a conventional type of automobile, showing a rear bumper applied thereto embodying one form of my invention.

Figure 2 is a top plan view of the same.

Figure 3 is an enlarged detail view showing the means for clamping the bumper bar in place on the tire rack, and Figure 4 is an enlarged detail view illustrating means for securing the bumper bar directly to the frame of the automobile.

Referring to the drawings in detail, the bumper comprises a supporting bar 10 of a length corresponding substantially with the average width of automobiles, which bar in my preferred form is secured to the supporting members 11 of the tire rack in the rear of the car by means of the U-shaped clamps 12. This bar near each end is provided with a plurality of openings.

Adjustably mounted on this bar are two units, namely right and left, which units are spaced apart so as to receive therebetween one or more spare casings or wheels, as best shown in Figure 1. Each unit comprises an impact member made up of two arc-shaped resilient bars 13—13, spaced apart vertically in parallel relation. While I have shown these members as being arc-shaped, I have done so because that is my preferred form, but I do not wish to be limited to that particular shape.

The ends of the impact members 13—13 are connected together by means of a bolt 14. Connecting with the ends of the impact members is an L-shaped resilient steel spring bar 15, having one leg thereof in engagement with the bar 10. This leg is provided with a plurality of openings spaced apart the same distance as the openings in the bar 10, so that by inserting the bolts 16, these units as a whole may be adjusted inwardly or outwardly to accommodate cars of different width, and readily, quickly and firmly secured in place by unskilled hands with the ordinary wrench.

From the description thus far, it will be seen that with this combination the impact sections can be made up at the factory in large quantities as a standard unit, shipped in knock down form, and readily and quickly assembled, adjusted and attached to most any type of automobile.

In the form shown in Figure 4, instead of attaching the bar 10 to the spare tire rack supporting members, I secure the bar directly to the frame members 17 of the automobile. In this case the bar 10 is provided near each end with a plurality of vertical openings so as to adapt it to frames of different width, and is secured to the frame members 17 by means of a bolt 18 passing downwardly through a suitable vertical opening in such members where the bar is properly held in alignment and place by the washers and nut shown. With this form, all that is necessary in applying it is to bore a vertical hole in the frame members 17.

Having thus described my invention, I claim:

A universal adjustable rear bumper for automobiles comprising in combination a supporting bar, a pair of impact sections spaced apart so as to receive therebetween a spare tire or the like, and means for adjustably mounting said impact sections on said bar so as to accommodate automobiles and fenders of different width and construction.

In witness whereof, I have hereunto subscribed my name to this specification in the presence of two witnesses.

OLIVER G. TEMME.

Witnesses:
CLARENCE J. LOFTUS,
K. A. HARGADEN.